United States Patent
Schröeder

[11] 4,054,372
[45] Oct. 18, 1977

[54] FOCUSING MECHANISM FOR VARIFOCAL OBJECTIVE

[75] Inventor: Wolfgang Schröeder, Bad Kreuznach, Germany

[73] Assignee: Jos. Schneider & Co. Optische Werke Kreuznach, Bad Kreuznach, Germany

[21] Appl. No.: 709,324

[22] Filed: July 28, 1976

[30] Foreign Application Priority Data

July 29, 1975 Germany .............................. 2533825

[51] Int. Cl.² .............................................. G02B 15/18
[52] U.S. Cl. .................................... 350/186; 350/187
[58] Field of Search ........................ 350/184, 186, 187

[56] References Cited

U.S. PATENT DOCUMENTS

| | | | |
|---|---|---|---|
| 3,348,899 | 10/1967 | Price | 350/184 |
| 3,961,845 | 6/1976 | Doi et al. | 350/184 |
| 3,975,089 | 8/1976 | Betensky | 350/187 X |

*Primary Examiner*—Paul A. Sacher
*Attorney, Agent, or Firm*—Karl F. Ross

[57] ABSTRACT

A varifocal objective with a four-component front lens group, including axially shiftable second and third components, is provided with a focusing mechanism for the joint displacement of these second and third components as well as a further lens member relatively to the axially fixed first component, that further lens member being either the fourth component of the front lens group or part of an otherwise fixed rear lens group. In the case of an afocal front lens group the last three components thereof are displaced in unison by the focusing mechanism. The lens shifts can be co-ordinated by electric servomotors under the control of stored data.

8 Claims, 8 Drawing Figures

FIG. 1a
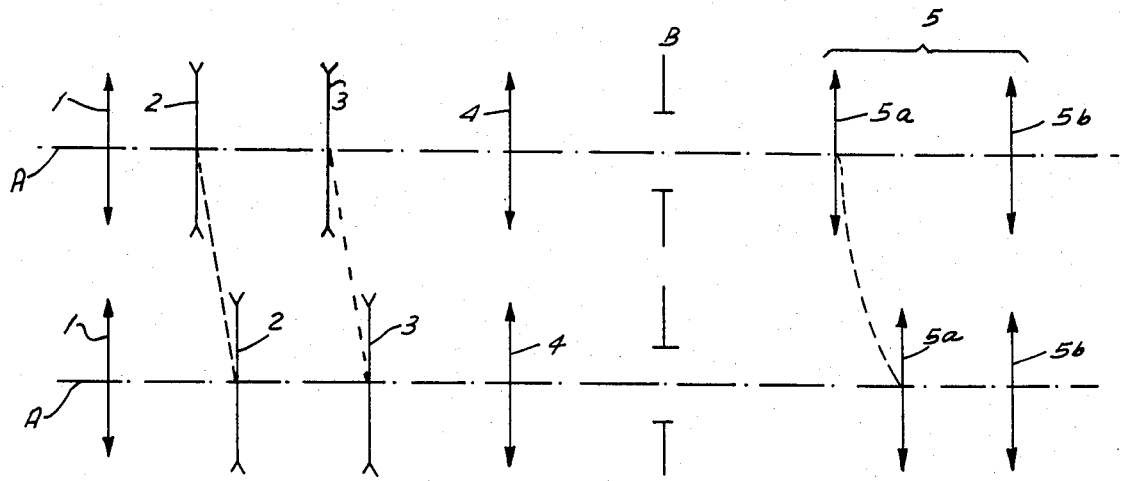
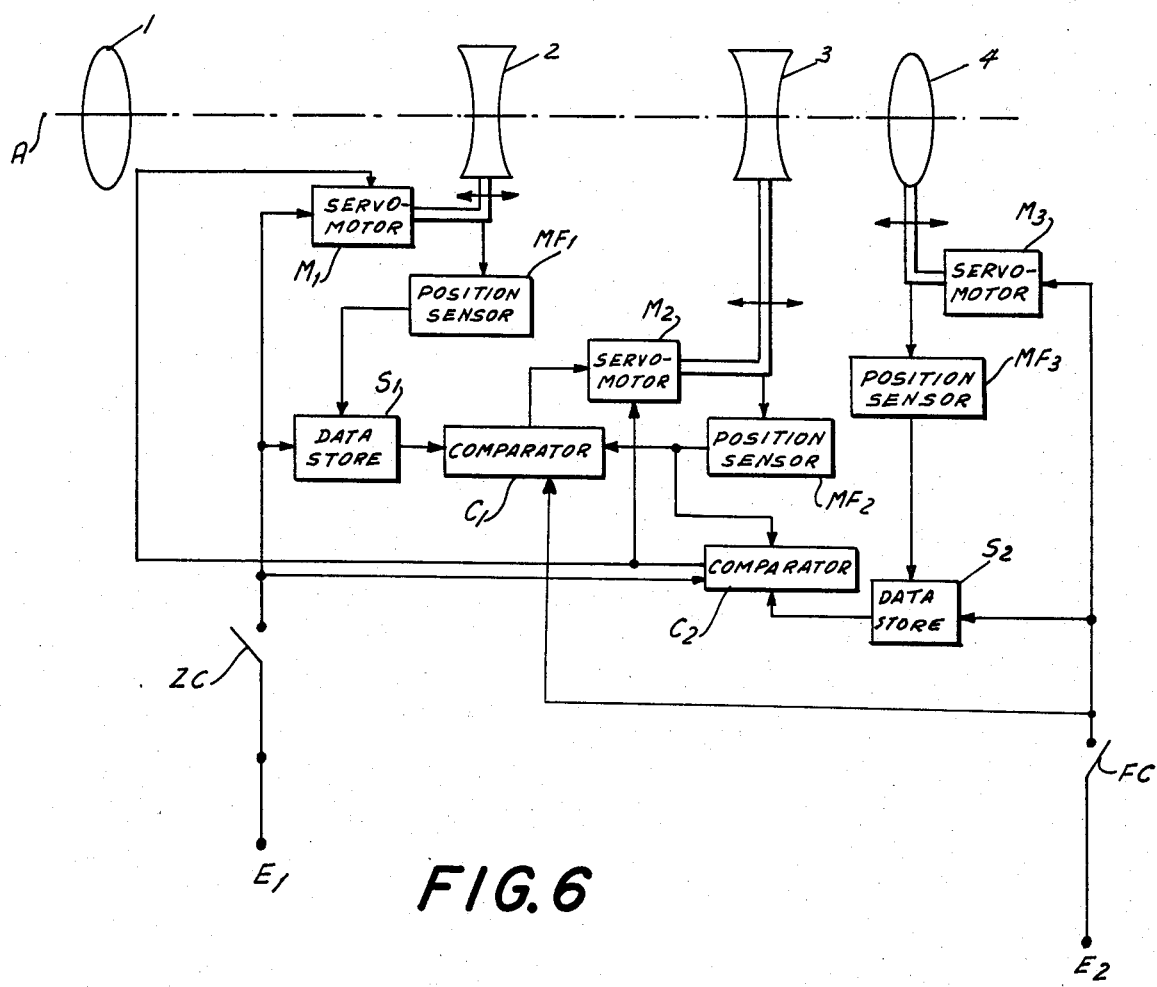
FIG. 6

FOCUSING MECHANISM FOR VARIFOCAL OBJECTIVE

FIELD OF THE INVENTION

My present invention relates to a focusable varifocal objective.

BACKGROUND OF THE INVENTION

Conventional varifocal objectives usually comprise an adjustable front group and a fixed rear group of coaxial lens members, the front group being constituted by an object-side first component considered stationary for the purpose of focal-length adjustment, axially shiftable second and third components, and an axially fixed fourth component. The first and fourth components are usually of positive refractivity whereas the shiftable second and third components are negatively refracting. The third component, sometimes termed compensator, moves in a manner designed to keep the image plane of the objective stationary during displacement of the second component or variator. Reference in this connection may be made, for example, to commonly owned U.S. Pat. No. 3,827,786 in the name of Karl Macher.

For focusing purposes, the quasi-stationary first component (or just a front lens thereof) is limitedly axially displaceable to an extent which does not significantly alter the selected overall focal length but shifts the rear focal plane of the objective relatively to the image plane. This axial displaceability of the first component or at least its front lens increases the physical axial length of the objective and also tends to cut off slanting incident rays, thus causing vignetting, unless the front lens is correspondingly enlarged. The presence of a large mobile front lens, however, makes the correction of aberrations more difficult; moreover, in a camera equipped with servofocusing the motor is burdened by the weight of this front lens. Finally, the air volume trapped behind the front lens within the camera housing impedes its movements unless fairly large vent openings are provided which, however, could make the optical system sensitive to atmospheric conditions.

OBJECT OF THE INVENTION

The object of my present invention, therefore, is to provide a focusing system for a varifocal objective which obviates the aforestated drawbacks without materially changing the selected focal-length setting.

SUMMARY OF THE INVENTION

I realize this object, in accordance with my present invention, by the provision of focusing means operatively coupled with the second and third components of the varifocal front group for jointly shifting same to vary the distance at which objects can be sharply focused on the image plane, the focusing means also being operatively coupled with a lens member disposed on the image side of the third component for axially shifting that lens member concurrently with the second and third components to maintain the preselected focal length of the objective. The joint shifting of the second and third components is, of course, independent of their separate shifting by the zooming means designed to vary that overall focal length.

The lens member chosen for the compensatory focusing displacement may be the normally fixed fourth component (or part thereof) of the varifocal front group but could also be one of the constituents of the normally fixed rear group, especially the first — usually positive — lens member of the latter group.

The zooming and focusing shifts of these various lens members can be carried out mechanically, as by means of lens barrels provided with the usual camming grooves or slots, or electronically with the aid of data stores and position sensors controlling the operation of the respective servomotors.

BRIEF DESCRIPTION OF THE DRAWINGS

The above and other features of my invention will now be described in detail with reference to the accompanying drawing in which:

FIG. 1a is a similar diagram relating to a modified varifocal objective;

FIG. 4 is an exploded isometric side view of a zooming and focusing mechanism for an objective of the type represented by the diagrams of FIGS. 1 and 1a;

FIG. 5 is a similar view of a zooming and focusing mechanism for an objective of the type shown in FIGS. 3 and 3a; and FIG. 6 is a block diagram of an electronic zooming and focusing circuit for use with an objective as represented in FIGS. 1 and 1a.

SPECIFIC DESCRIPTION

Figure 1:
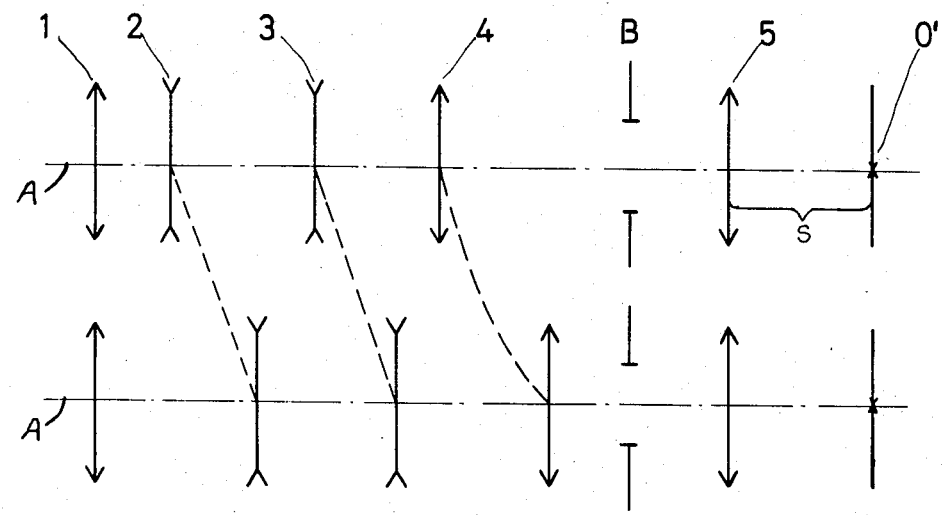
FIG. 1 is a diagram schematically illustrating the focusing displacement of certain components in a five-component varifocal objective according to the invention.
Figure 2:
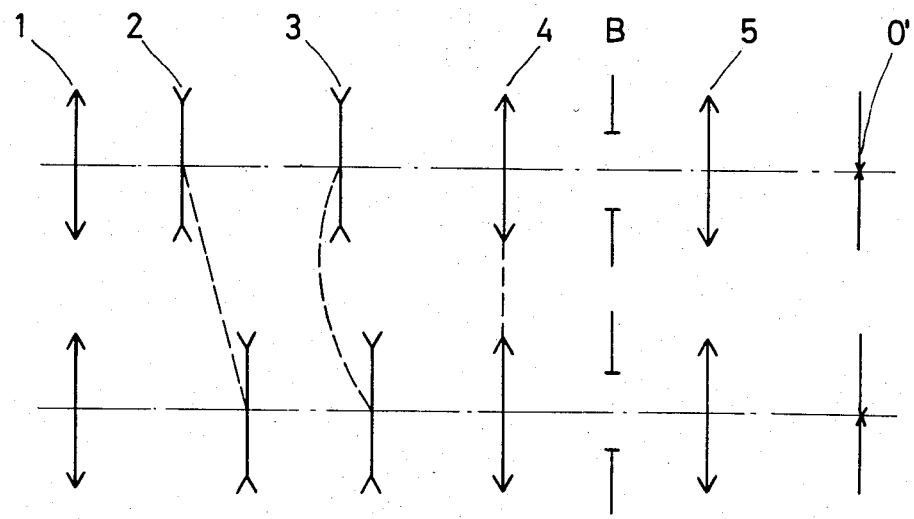
FIG. 2 is a diagram similar to FIG. 1, schematically illustrating the zooming displacement of certain components of the objective represented in FIG. 1.

In FIGS. 1, 1a and 2 the several objective components have been illustrated schematically as thin lenses even though at least some of these components will generally consist of more than one lens. In all embodiments described hereinafter, the objective comprises an axially fixed positive first component 1, an axially shiftable negative second component 2, an axially shiftable third component 3, a positive fourth component 4 and a positive rear component 5 usually constituted by a multilens group. A diaphragm B is inserted between front group 1–4 and rear group 5.

The conventional focal-length adjustment, schematically illustrated in FIG. 2, involves only the negative components 2 and 3, with component 3 moving first forwardly and then rearwardly while component 2 is shifted toward the rear from a position of minimum focal length to a position of maximum focal length (top and bottom graphs in FIG. 2). During this displacement along the optical axis A, the position of the image plane O' remains fixed.

In FIG. 1 I have shown how, from the starting position similar to that illustrated in the upper graph of FIG. 2, the two negative components 2 and 3 are jointly displaced at the same rate toward the rear with reference to the axially fixed first positive component 1. As far as these three components 1–3 are concerned, such a displacement is equivalent to a forward shifting of the first component as is conventionally done for focusing purposes. In the present instance, however, such a movement — if unaccompanied by a compensatory adjustment of some other lens member — could not bring about the desired shift of the secondary focal point of the system with reference to the image plane O' without significantly altering the preselected focal length. Thus, a compensatory movement is simultaneously imparted to component 4 at a rate nonlinearly related to that of components 2 and 3 whereby the overall focal length is kept constant on passing from the position of the upper graph to that of the lower graph with focusing of the objective upon closer objects.

Let us consider, by way of example, a conventional varifocal objective with a back-focal length $s$ (FIG. 1) of 12 mm having a relative aperture of 1:2.1 and an overall focal length variable between $f_{min} = 20$ mm and $f_{max} = 300$ mm by a shifting of its negative components 2 and 3 in the manner indicated in FIG. 2. The following values represent the focusing displacement of lens members 2 and 3 on the one hand and lens member 4 on the other hand from the position shown in the upper graph of FIG. 1 to that shown in the lower graph.

TABLE

| Rightward shift of components 2 and 3 (mm) | Rightward shift of component 4 (mm) | Focusing distance (meters) |
| --- | --- | --- |
| 0 | 0 | ∞ |
| 5 | 5.93 | 4.42 |
| 10 | 11.94 | 2.46 |
| 15 | 18.06 | 1.81 |
| 20 | 24.30 | 1.48 |

As illustrated in FIG. 1a, the lens member undergoing a compensatory shifting need not be the component 4 of the front group but could be a positive lens 5a (preferably the one nearest the diaphragm space) forming part of rear group 5, that group also comprising one or more axially fixed lenses 5b.

If lens members 2–4 are designed to complement the front member 1 to an afocal system, there will be a field of parallel rays 6 in the diaphragm space between the varifocal front group 1–4 and the rear group 5. In that instance the spacing between components 4 and 5 becomes noncritical whereby the three movable members 2–4 can be shifted as a unit, relatively to components 1 and 5, between the position shown in FIG. 3 (with focus on infinity) and the closeup position of FIG. 3a in which the objective is focused on a nearby object. An intermediate image is formed in both positions (and in all intervening ones) between components 1 and 2. The amount of shift required for focusing purposes depends on the individual focal length of component 1 and corresponds to that conventionally imparted to the front lens, yet in the present instance no increase occurs in the total axial length of the objective.

Figure 4:
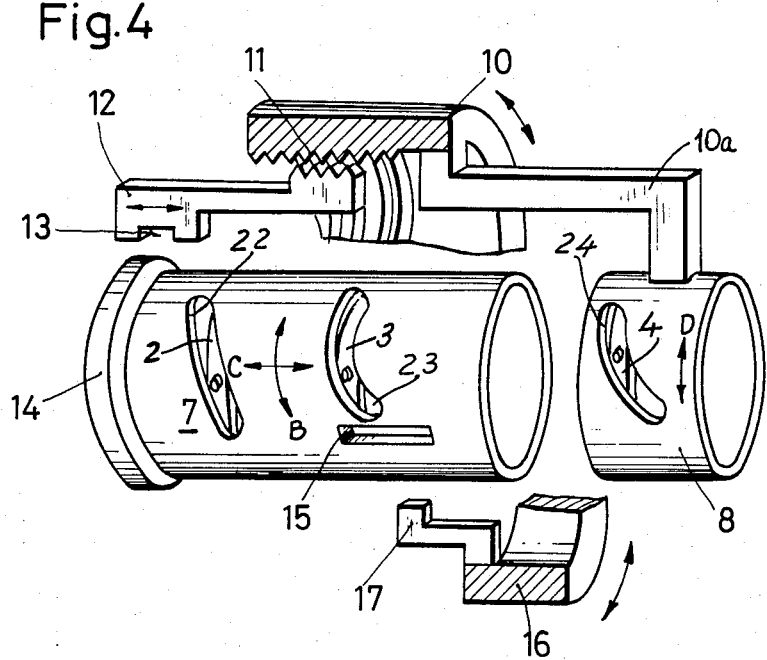

Reference will now be made to FIG. 4 showing a lens barrel 7 centered on the optical axis of the system, this lens barrel being provided with conventional camming slots 22 and 23 for displacing the lens members 2 and 3 in the manner indicated in FIG. 2 upon rotation of that barrel about its axis (arrow B). Such rotation can be brought about by a zooming mechanism including a setting ring 16 from which an arm 17 extends into a slot 15 or lens barrel 7. This lens barrel is also axially reciprocable (arrow C) with the aid of a focusing ring 10 having threads 11 meshing with a rack 12, a bifurcated extremity 13 of this rack straddling an annular flange 14 of the lens barrel; rack 12 is guided for movement parallel to the barrel axis by mounting means not shown. An arm 10a extending from focusing ring 10 is rigid with another, shorter lens barrel 8 surrounding the positive lens member 4 which is guided therein by a camming slot 24. All these lens members are, of course, held against rotation by conventional means such as stops engaging the pins which traverse the camming slots 22–24.

A change in the overall focal length (zoom effect) with the aid of ring 16 does not affect the lens member 4 since only the lens barrel 7 rotates in one or the other sense as indicated by arrow B. On the other hand, a rotation of focusing ring 10 causes this lens barrel to slide axially, as indicated by arrow C, together with lens members 2 and 3 while lens barrel 8 rotates (arrow D) and axially shifts the lens member 4. Thus, the mechanism of FIG. 4 brings about the lens displacements diagrammatically shown in FIGS. 1 and 2.

Figure 3:
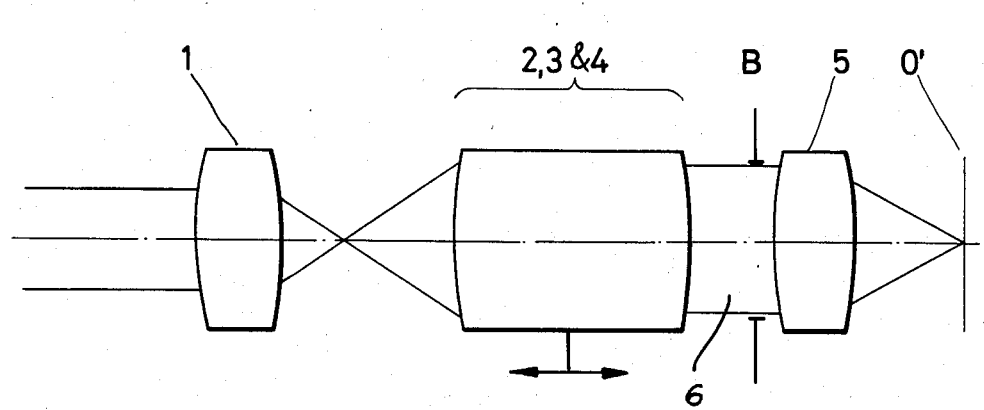
FIG. 3 diagrammatically illustrates an objective with an afocal front group focused upon infinity.
Figure 3A:
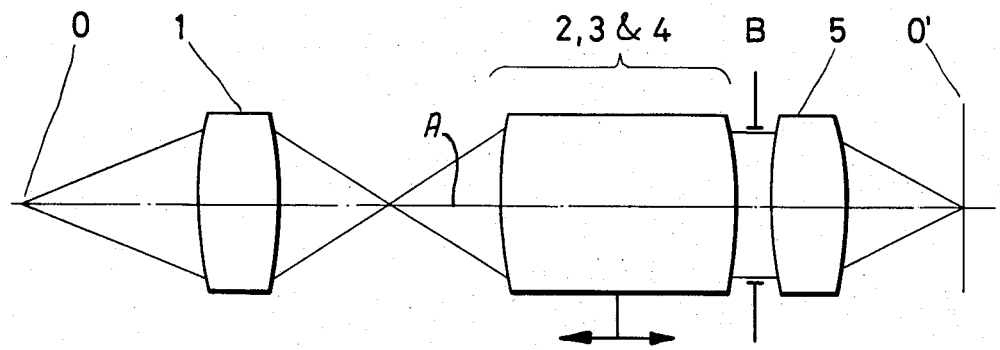
FIG. 3a is a view similar to FIG. 3, showing the objective focused upon a finite object distance.
Figure 5:
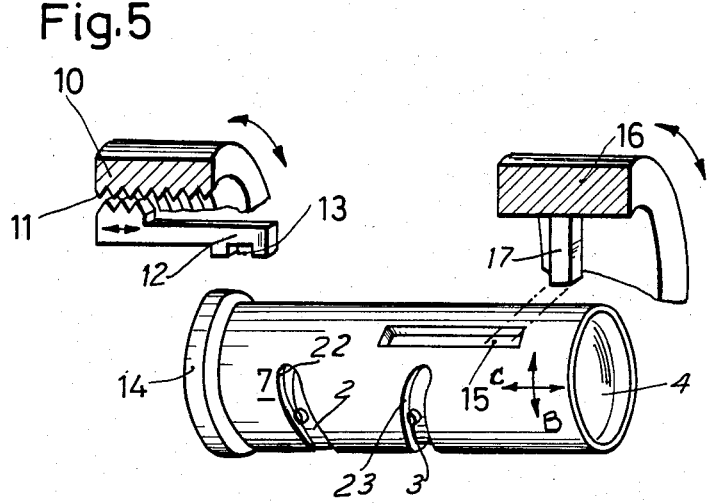

In FIG. 5, in which lens members 2–4 are assumed to be part of an afocal group as described with reference to FIGS. 3 and 3a, component 4 is fixedly held in lens barrel 7 which is rotatable and slidable in the aforedescribed manner under the control of rings 16 and 10, respectively. A rotation of the lens barrel under the control of zooming ring 16 has no effect upon the axial position of component 4 whereas an axial shift under the control of focusing eing 10 displaces all three lens members concurrently.

In FIG. 6 I have shown an electronic control system for shifting the components 2, 3 and 4 without a slotted lens barrel. A zooming-control switch ZC, when closed, connects a voltage source $E_1$ to a reversible servomotor $M_1$ for axially shifting the negative lens member 2; switch ZC actually has two working positions for energizing the motor $M_1$ in one sense or the other, e.g. as described in commonly owned U.S. Pat. No. 3,165,044 in the name of Paul Himmelsbach. A motion feeler or position sensor $MF_1$, coupled with lens member 2, reports the position of that lens member to a data store $S_1$ such as a read-only memory which is activated upon closure of switch ZC to deliver a signal representative of the corresponding zooming position of lens member 3 to one input of a comparator $C_1$ also having another input connected to a position sensor $MF_2$ which is coupled with lens member 3. Comparator $C_1$ thereupon energizes a servomotor $M_2$ which displaces the lens member 3 until its position conforms to that of lens member 2 in accordance with the schematic showing of FIG. 2. The position information available from sensor $MF_2$ is also fed to a comparator $C_2$ which, however, is inhibited at this time by a blocking voltage on another lead from switch ZC.

A third servomotor $M_3$, controlling the displacement of lens member 4, is unaffected by closure of switch ZC but is energizable from a voltage source $E_2$, in one sense or the other, by a similarly constructed focusing-control switch FC which also activates a data store $S_2$ receiving the output of a position sensor $MF_3$ coupled with lens members 4.

Data store $S_2$ works into comparator $C_2$ which, with comparator $C_1$ blocked upon closure of switch FC, controls the two servomotors $M_1$ and $M_2$ to correlate the position of lens members 2 and 3 with that of lens member 4 as indicated schematically in FIG. 1.

If lens group 1–4 is afocal, as discussed with reference to FIGS. 3 and 3a, data store $S_2$ will be omitted along with comparator $C_2$ and position sensor $MF_3$; servomotors $M_1$, $M_2$ and $M_3$ are then energizable in parallel from source $E_2$ through the closed switch FC.

The provision of a fixed front lens, made possible by the present improvement, allows the camera to be equipped with stable holders for filter and lens attachments as well as devices for the insertion of film titles or the like. The normally unavoidable decentering effect due to rotation of the front lens for focusing purposes is eliminated.

I claim:

1. In a varifocal objective comprising a plurality of coaxial lens members constituting an axially fixed object-side first component, an axially shiftable second component following said first component, an axially shiftable third component following said second component, a fourth component following said third component and an image-side fifth component following said fourth component, the combination therewith of:

zooming means operatively coupled with said second and third components for axially shifting same at different rates to selectively vary the overall focal length of the objective while maintaining a stationary image plane beyond said further lens members; and focusing means operatively coupled with said second and third components for jointly shifting same to vary the distance at which objects can be sharply focused on said image plane, one of said lens members disposed on the image side of said third component being axially shiftable and operatively coupled with said focusing means for displacement thereby concurrently with said second and third components to maintain the selected overall focal length.

2. The combination defined in claim 1 wherein said second and third components are mounted in a first lens barrel provided with camming slots for the axial shifting thereof and coupled with said zooming means for rotation thereby, said one of said lens members being mounted in a second lens barrel provided with a camming slot for the axial shifting thereof, said focusing means being directly connected with said second lens barrel for rotating same and being threadedly coupled with said first lens barrel for axially displacing the latter.

3. The combination defined in claim 1 wherein said one of said lens members constitutes said fourth component.

4. The combination defined in claim 3 wherein said second, third and fourth components complement said first component to an afocal group, said focusing means maintaining said second, third and fourth components at an invariable relative distance selected by said zooming means.

5. The combination defined in claim 4 wherein said second, third and fourth components are mounted in a common lens barrel provided with camming slots for the axial displacement of said second and third components, said lens barrel being coupled with said zooming means for rotation thereby and with said focusing means for axial displacement thereby, said second, third and fourth components complementing said first component to an afocal group.

6. The combination defined in claim 1 wherein said one of said lens members is a part of said fifth component.

7. The combination defined in claim 1, further comprising a pair of servomotors for respectively shifting said second and third components and a further servomotor for shifting said one of said lens members, said zooming means including a first control circuit for the energization of said pair of servomotors, said focusing means including a second control circuit for the energization of all said servomotors.

8. The combination defined in claim 7 wherein said first control circuit includes a position sensor of one of the axially shiftable components and a data store addressable by said position sensor for determining the displacement of the other axially shiftable component.

* * * * *